United States Patent

[11] 3,593,500

| [72] | Inventors | Paul D. Ritland<br>Secane;<br>Eugene J. Barsness, Broomall, both of, Pa. |
|---|---|---|
| [21] | Appl. No. | 778,672 |
| [22] | Filed | Nov. 25, 1968 |
| [45] | Patented | July 20, 1971 |
| [73] | Assignee | Westinghouse Electric Corporation<br>Pittsburgh, Pa. |

[54] DEVICE FOR SEPARATING MOISTURE-LADEN VAPOR
5 Claims, 5 Drawing Figs.

[52] U.S. Cl.................................................. 55/319,
55/269, 55/321, 55/329, 55/418, 55/466, 122/483, 122/488
[51] Int. Cl........................................................ B01d 45/08
[50] Field of Search........................................... 55/175,
176, 174, 186, 188, 319, 321, 322, 325, 326, 329,
419, 269, 418, 440, 462, 465, 466; 122/34, 488,
491, 483; 210/452

[56] References Cited
UNITED STATES PATENTS

| 1,761,170 | 6/1930 | Andrews | 55/419 |
|---|---|---|---|
| 2,874,798 | 2/1959 | Walker | 202/158 |
| 3,160,571 | 12/1964 | Mulford et al. | 202/173 |
| 3,174,914 | 3/1965 | Worthen et al. | 202/173 |
| 3,279,533 | 10/1966 | Kersteter et al. | 159/31 |
| 3,472,209 | 10/1969 | Roffler | 122/483 |

FOREIGN PATENTS

| 931,235 | 7/1963 | Great Britain | 122/483 |
|---|---|---|---|

*Primary Examiner*—Frank W. Lutter
*Assistant Examiner*—Bernard Nozick
*Attorneys*—A. T. Stratton, F. P. Lyle and E. Cristiano, Jr.

ABSTRACT: This invention provides an arrangement for improving the removal of moisture from a moisture-laden hot pressurized vapor, such as steam, in a vessel having a moisture separator, by directing the high-velocity incoming steam through a manifold extending in side-by-side lengthwise relation with the separator and having outlet orifices along its length formed in groups and arranged in such a manner that the total cross-sectional area of the orifices in the groups decreases in the direction of flow of steam through the manifold. Vanes extending transversely to the length of the manifold are employed to turn and direct the steam from the outlets into a diffusion space between the separator and the manifold, and baffle plates are mounted across the vanes to prevent direct infringement of the steam issuing as jets from the orifices.

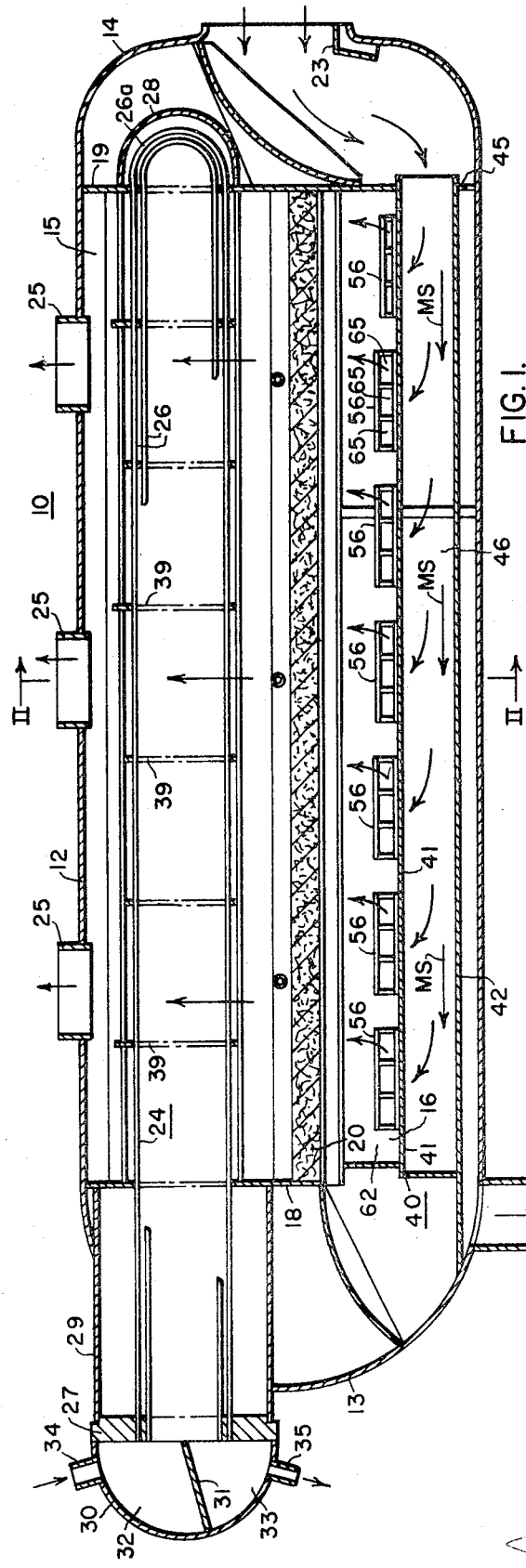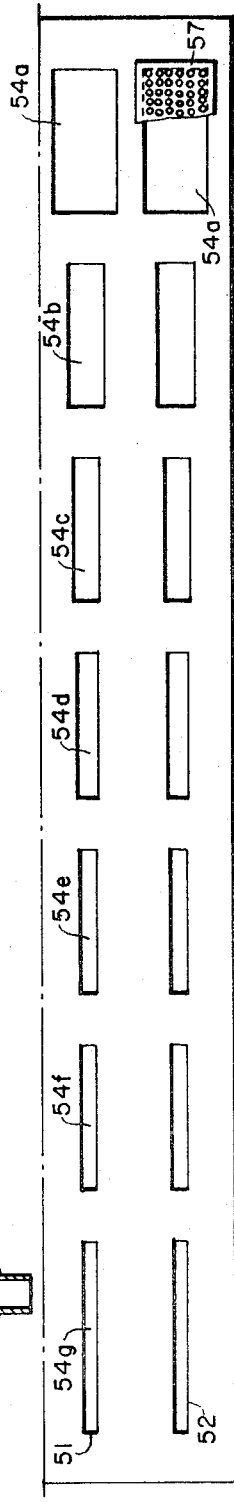
INVENTORS
Paul D. Ritland and
Eugene J. Barsness

DEVICE FOR SEPARATING MOISTURE-LADEN VAPOR

BACKGROUND OF THE INVENTION

In large multiunit steam turbine power plants employing high-pressure, high-temperature, motive steam, removal of moisture after partial expansion in the high-pressure turbine unit has become generally accepted practice in view of the attendant advantages. It has also become conventional practice to reheat the thus demoisturized steam to a superheated state. Since large volumetric flow rates of motive steam must necessarily be demoisturized and reheated, both of these functions are now attained in a single vessel having a moisture separator structure and a steam reheater structure disposed therein. Such devices are now well known in the art as moisture separator/reheater units and are disposed externally of the turbine and interposed between the high-pressure turbine unit and the intermediate pressure turbine unit. Such moisture separator/reheater units may also be employed between the intermediate pressure turbine unit and the low-pressure turbine units, if desired, with further well-known attendant advantages.

In view of the above, as the turbines get larger and more powerful, their demands and requirements for motive steam become greater and the moisture separator/reheater units must necessarily handle the larger volumetric steam flow rates with minimum pressure drop loss, yet high moisture removal efficiency. Other considerations require that the above be attained in a vessel of reasonably compact size, hence the design of the moisture separator/reheater unit becomes a critical factor in the performance of the unit.

Mechanical moisture separators are effective devices for removing entrained liquid particles in vapor, for example, water particles from steam. However, their ability to remove such particles is dependent primarily on the velocity of the steam therepast. Moisture separators, of the demister type, i.e. wire mesh or blanket type in which filamentary material is compacted in a random fashion, are especially sensitive to vapor velocity and above a certain velocity the mesh becomes overloaded and becomes so inefficient that to all intents and purposes it ceases to perform its function of removing liquid particles from the high velocity vapor.

Furthermore, the wire mesh tends to wear away, i.e. erode, at high fluid impingement velocities.

In view of the above, for optimum performance, it is essential to distribute the moisture-laden steam flow in a manner to approach the separator at a uniform low velocity, even though large volumetric flow must be accommodated.

SUMMARY OF THE INVENTION

In accordance with the teachings of this invention, the moisture separator/reheater is formed with an axially elongated tubular casing closed at its opposite ends, and a moisture separator is disposed within the casing and extending in axial direction. The moisture separator is preferably of the demister or blanket type and divides the casing into a first or lower axially elongated chamber for the reception of incoming moisture-laden vapor and a second or upper axially elongated chamber for receiving the moisture-free vapor from the moisture separator.

The lower chamber is connected to an inlet for admitting moisture-laden, pressurized hot vapor thereto, and the upper chamber is connected to an outlet for receiving the demoisturized vapor therefrom.

An axially elongated manifold, extending coextensively with the demister, is disposed within the lower chamber. The manifold is closed at one end and connected at its opposite end to the vapor inlet, and includes an axially extending wall structure having a large plurality of vapor outlets of diminishing cross-sectional area in the direction of flow of the moisture-laden vapor. The vapor outlets are preferably circular orifices of uniform size arranged in discrete groups disposed in spaced relation along the wall and the number of orifices in each group decreases in the direction of flow of vapor through the manifold. The groups of orifices are divided into smaller groups by axially spaced vanes, and baffle plates are provided across the tops of the baffles.

With this arrangement the flow of moisture-laden vapor is divided into a larger number of discrete jets by the orifices; the discrete jets are turned upwardly by the vanes, and the baffles prevent direct impingement of the jets against the moisture separator.

The manifold structure is disposed in spaced relation with the separator and the space therebetween permits diffusion of the vapor.

Accordingly, the incoming moisture-laden vapor is directed against the vapor separator with uniform velocity, and with uniform pressure drop, thereby utilizing the entire surface of the moisture separator to the same degree and preventing harmful localized overloading of the moisture separator, thereby preventing localized failure of the separator in its moisture-separating function.

BRIEF DESCRIPTION OF THE DRAWINGS

FIG. 1 is a vertical sectional view taken along the longitudinal axis of a moisture separator/reheater unit formed in accordance with the invention;

FIG. 3 is a view of the upper wall structure of the manifold shown in FIG. 1;

PREFERRED EMBODIMENTS

Figure 2:
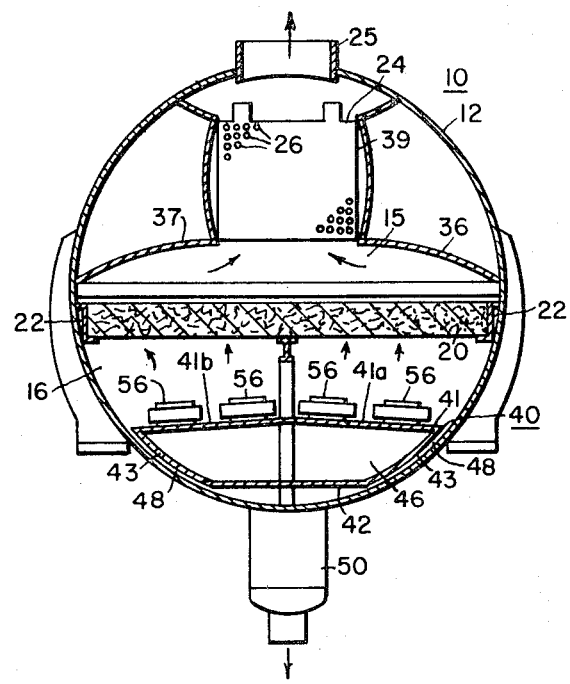
FIG. 2 is a transverse sectional view taken along the line II-II of FIG. 1.

Referring to the drawings in detail, and especially FIGS. 1 and 2, there is shown a unitary device 10 formed in accordance with the invention, for removing moisture from moisture-laden vapor (for example, steam) in a highly pressurized state and heating the demoisturized vapor to a dry and/or superheated state. This type of device is generally known in the art and is usually termed a "moisture separator/reheater unit." For simplicity of explanation and understanding, the above term will be employed in this specification and also "steam" and "water" will be employed instead of the broader terms "vapor" and "moisture" in the description of the moisture separator/reheater unit, for the same reasons, and not by way of limitation.

The moisture separator/reheater 10 is provided with a tubular axially elongated shell or casing 12 closed at its ends by a pair of oppositely disposed end bells 13 and 14. The interior of the casing 12 is divided into two axially extending chambers, i.e. an upper chamber 15 and a lower chamber 16, by internal structure including a pair of end partitions 18 and 19 and a moisture separator structure 20.

The moisture separator structure 20 is axially elongated and extends from the end partition 18 to the end partition 19, and is of a width substantially equal to the diameter of the casing 12 and extending generally diametrically thereacross (see FIG. 2). The moisture separator structure 20 is preferably of the "demister" type, which as well known in the art, comprises a thick pad or blanket of filamentary material (steel wool or the like) randomly matted or compacted and supported in the casing 12 by suitable side rails 22.

The lower chamber 16 is termed the moisture-laden steam collection chamber and hot, pressurized moisture-laden steam from any suitable source such as a high-pressure turbine (not shown) is admitted thereto by a steam inlet structure 23 extending through the end bell 14 and end partition 19.

The upper chamber 15 is termed the moisture-free steam heating chamber and moisture-laden steam flow from the lower chamber 16 passes through the moisture separator 20, where it is relieved of its entrained moisture and then in a demoisturized state passes through the upper chamber 15, where it is heated by a heater structure 24 to a dry and superheated state. The thus reheated steam is then delivered from the chamber 15 through a plurality of suitable upper outlets 25, for consumption in any desired steam-utilizing device, such as a low-pressure steam turbine (not shown).

The heater structure 24 is generally conventional and includes a bundle of tubes 26 of the "U" or hairpin type received at their open ends in a suitable tube sheet 27 and extending through the end partition 18 for the full length of the upper chamber 15 to the end partition 19. The end partition 19 may further include a semicylindrical closure member 28 to receive the right portions 26a of the tubes 26 and a tubular shell portion 29 may be provided to enclose the open end portion of the tubes 26 extending beyond the end bell 13 to the tube sheet 27. The tube sheet 27 is preferably disc-shaped and is sealingly connected at its periphery to a hemispherical channel head 30 in any suitable manner. Within the channel head 30 there is a partition 31 which, together with the channel head and tube sheet, defines a heating steam inlet chamber 32 and a vitiated steam outlet chamber 33. Heating steam from any suitable supply (not shown) is admitted through a suitable inlet 34 and traverses the bundle of U-tubes 26 to heat the demoisturized steam in the chamber 15 and is then withdrawn from the outlet chamber 33 in a vitiated and/or condensed state through a suitable outlet 35.

As best seen in FIG. 2, the upper chamber 15 is further defined by transversely opposed wall structure 36 and 37 formed in a manner to direct the demoisturized vapor flow from the moisture separator 20 past the bundle of heater tubes 26 for optimum heat exchange therewith before delivery to the outlets 25. Also, the U-tubes 26 may be supported at spaced intervals along their length by suitable perforated support plates 39.

In accordance with the invention, manifold structure 40 is provided in the lower chamber 16.

The manifold structure, as shown in FIGS. 1 and 2 comprises upper, lower and sidewall structures 41, 42 and 43, respectively, extending in an axial direction from the end partition 18 to the end partition 19 and is closed at the partition 18 thereby, but extends through an opening 45 in the partition 19 to communicate with the steam inlet structure 23. The manifold wall structure defines an axial moisture-laden steam flow passageway 46 coextensive with and parallel to the moisture separator 20 and having a cross-sectional shape that is generally inverted trapezoidal, as best seen in FIG. 2. The sidewalls 43, however are curved to conform to the adjacent curvature of the outer shell, and are inwardly spaced therefrom to a small degree to provide a pair of opposed drain passages 48 for directing water removed from the moisture-laden steam by the moisture separator 20 to a suitable drain outlet 50.

The upper manifold wall 41 is provided with oppositely sloping surface portions 41a and 41b (FIG. 2) to facilitate draining of water therefrom to the drain passages 43. Since the surface portions 41a and 41b are identical, only the surface portion 41a has been shown in detail (FIG. 3) and will be described in detail.

The manifold wall portion 41a is provided with two longitudinal rows 51 and 52 of rectangular openings 54a, 54b, 54c, 54d, 54e, 54f and 54g. The openings are of graduated cross-sectional area diminishing from right to left, i.e., opening 54a has the largest cross-sectional area while opening 54g has the smallest cross-sectional area. Above each of the openings 54a—54g there is provided a steam flow control structure 56, as shown in FIG. 1.

Figure 4:
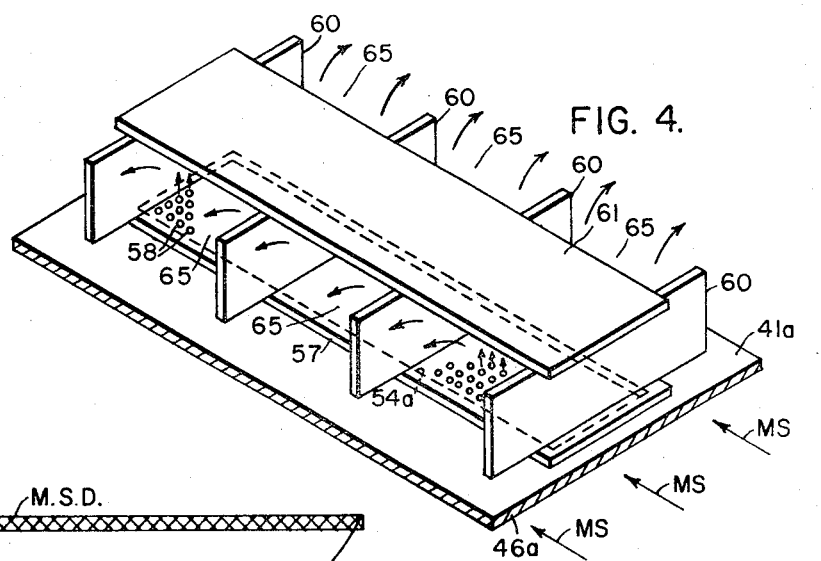
FIG. 4 is an enlarged isometric view of one of the vapor outlet box structures.

The steam flow structures 56 are substantially similar to each other, as indicated in FIGS. 1 and 2. Referring particularly to FIG. 4, where one of the steam flow structures 56 is shown in enlarged isometric and associated with the rectangular openings 54a, this structure comprises an orifice plate 57 overlying the associated opening and having a large plurality of circular orifices 58 of equal size and arranged in a geometric group. At spaced intervals along the orifice plate 57, there are provided a group of vanes 60 (four in the example) disposed normal to the manifold wall portion 41a and extending upwardly therefrom. The vanes extend transversely to the direction of flow of the moisture-laden steam through the manifold passageway 46, indicated by the arrows MS, and are of equal rectangular size and shape. There is further provided a rectangular baffle plate 61 extending across the top edges of the vanes and attached thereto in any suitable manner. The vanes 60 are somewhat longer than the width of the rectangular opening 54a and the baffle plate 61 is of a length and width substantially equal to the length and width of the opening 54a.

Although the steam flow structures 56 are of similar construction, as described above, the orifices plates 57 associated with each opening 54a—54g are provided with progressively smaller groups of circular orifices 58, commensurate with the area of the associated rectangular opening. Accordingly, the total cross-sectional area of the orifices in each group is progressively smaller, commensurate with the area of its associated rectangular opening (54a—54g.)

Referring to FIGS. 1 and 2, the upper wall 41 of the manifold is disposed in downwardly spaced relation with the moisture separator 20 and jointly therewith forms a space 62, termed a vapor diffusion space.

OPERATION

Before discussing the operation of the invention, a brief discussion regarding flow through a simple uniformly perforated manifold is in order.

Due to the high velocity of the vapor flow through such a manifold, equal or uniform flow through the perforations is not attainable because the orifice discharge coefficient near the upstream end of the manifold is low because the velocity of the moisture-laden vapor in the manifold is high and parallel to the manifold; and near the closed downstream end the orifice discharge coefficient is high because the velocity is low and the static pressure is low.

Figure 5:
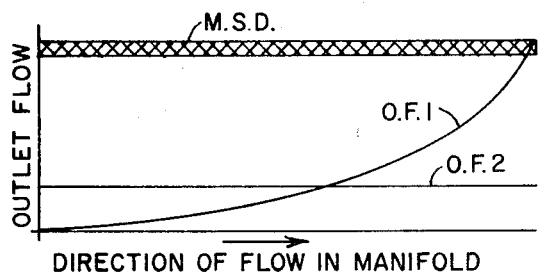
FIG. 5 is a chart illustrating vapor flow characteristics of the invention.

Hence, as indicated in the chart in FIG. 5, with such a manifold, the outlet of flow O.F.I. from the manifold is nonuniform and increases from a very low value at the inlet to a very high value at the outlet. The moisture separator M.S., as illustrated therein, under such conditions is thus dangerously overloaded with moisture-laden vapor at one end and greatly underloaded at its opposite end. The overloaded portion of the moisture separator M.S. ceases to function, or at least will not remove the required amount of moisture from the moisture-laden vapor. Further when a moisture separator M.S.D. of the demister type is employed, the filamentary material is subject to severe erosion due to the attendant high impingement velocities in the overloaded areas.

With the invention, as indicated by the line O.F.2, the outlet flow is maintained at a uniform value throughout the length of the manifold passageway 46 even though the discharge coefficient of the moisture-laden vapor is not uniform. Accordingly, the moisture separator M.S.D., as illustrated therein, is uniformly loaded and is effective to remove moisture from the moisture-laden steam with the highest efficiency within its capability.

With the above in mind, the operation of the manifold and the flow control structures 56 disclosed is as follows. High-velocity, high-pressure, moisture-laden steam flows from the inlet 23 through the manifold passage 46 in a direction parallel to the plane of the moisture separator 20, as indicated by the arrows MS. Due to the pressure difference across the upper manifold wall 41, as best shown in FIG. 4, the steam flows upwardly and outwardly through the openings 54a—54b at a uniform rate predicated by the total cross-sectional area of the grouped orifices 58 in each of the plates 57 associated with the respective openings. The flow through each of the orifices is in the form of discrete jets, which jets are directed upwardly by the vanes 60 into impingement with the baffle plates 61. Hence the baffles 61 are effective to deflect and prevent direct impingement of the issuing jets against the moisture separator 20.

The baffle plate 61 and its associated vanes 60 further serve to define a plurality of oppositely directed vents 65 through which the deflected jets enter the diffusion space 62. During this step, the initial velocity of the jets is partially diffused and the thus diffused moisture-laden steam is directed upwardly through the moisture separator 20 in a uniform flow pattern and at uniform velocity.

Accordingly, the entire surface of the moisture separator 20 is functional within its best operating limits to efficaciously remove the maximum amount of moisture from the moisture-laden steam before admission to the heating chamber 15. The heater 24 is thus rendered effective to reheat the steam to a dry and superheated state before delivery from the outlet 25.

We claim:

1. A device for separating moisture from moisture-laden pressurized vapor, comprising
    an axially elongated tubular casing,
    a moisture-separating device disposed within said casing and extending axially thereof,
    means associated with said moisture-separating device to divide said casing into a first chamber and a second chamber substantially coextensive with said moisture-separating device,
    means for admitting moisture-laden pressurized vapor into said first chamber,
    means disposed in said first chamber for directing the flow of the pressurized vapor from said chamber to said moisture-separating device at substantially uniform velocity throughout the entire length of said moisture-separating device,
    whereby the moisture separator is effective to remove moisture from the moisture-laden vapor and direct the substantially moisture-free vapor into said second chamber,
    said vapor directing means including an axially extending wall structure at least partially defining a manifold,
    said wall structure having a plurality of vapor outlets of graduated total cross-sectional area,
    the total cross-sectional area of said vapor outlets diminishing in the direction of flow of the moisture-laden vapor through the manifold,
    said vapor outlets comprising a plurality of orifices arranged in discrete groups, said groups being disposed in spaced relation along the axial length of the manifold wall, and
    said vapor outlets of each of said groups of orifices being divided into smaller groups by groups of vanes disposed normal to the manifold wall, said vanes being effective to direct the resulting vapor jets from the orifices in a direction normal to the flow of vapor in the manifold.

2. The structure recited in claim 1, and further including
    a baffle plate extending across each group of vanes to promote diffusion of the vapor jets and to prevent direct impingement of the individual jets against the moisture-separating device.

3. A device for separating moisture from moisture-laden pressurized vapor, comprising
    a horizontally elongated tubular casing closed at both ends, and having an inlet at one end for admitting moisture-laden pressurized vapor and an upwardly extending outlet intermediate its ends for delivering moisture-free vapor from said casing,
    a moisture-separating blanket of randomly matted filamentary material disposed in said casing,
    means cooperatively associated with said blanket for dividing the casing into a lower chamber communicating with said inlet and an upper chamber communicating with said outlet,
    a manifold structure for directing moisture-laden vapor from the lower chamber to said blanket,
    said manifold including a horizontally extending wall structure at least partially dividing said lower chamber into a longitudinally extending flow passage for the incoming vapor and a coextensive diffusion passage, the diffusion passage being disposed above the incoming vapor passage, and
    means including a plurality of orifices in said manifold wall structure for directing the moisture-laden vapor therethrough into said diffusion passage at substantially uniform velocity throughout the entire length of said wall structure,
    said orifices being arranged in a manner to provide moisture-laden vapor outlets of diminishing cross-sectional area in the direction of flow of the moisture-laden vapor through said manifold structure,
    said orifices also being arranged in spaced groups and the number of orifices in said groups decreasing from group to group to provide the diminishing cross-sectional area of the vapor outlets.

4. The structure recited in claim 3, and further including
    a plurality of vanes extending upwardly from the manifold wall structure and transversely to the flow of vapor in the manifold to deflect the vapor upwardly.

5. The structure recited in claim 4, and further including
    baffle plate structure extending horizontally across the vanes to promote diffusion of the vapor jets through the orifices and to prevent direct impingement of the individual jets against the surface of the moisture separator blanket.